(No Model.) 3 Sheets—Sheet 1.
W. L. COFFIN.
POTATO PLANTER AND SEED DRILL.
No. 408,585. Patented Aug. 6, 1889.
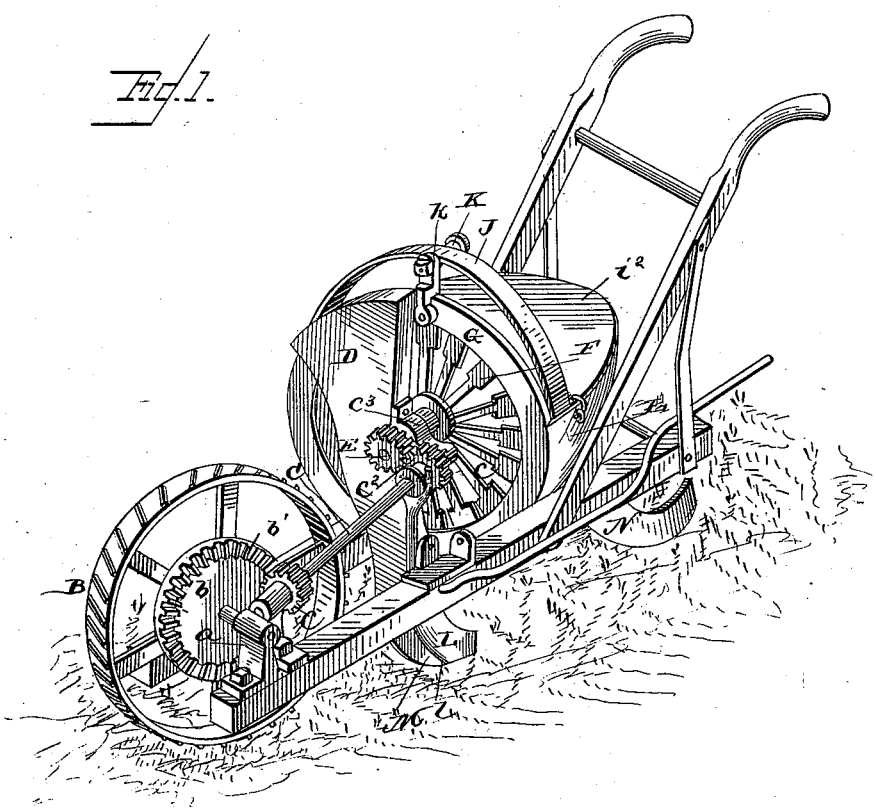
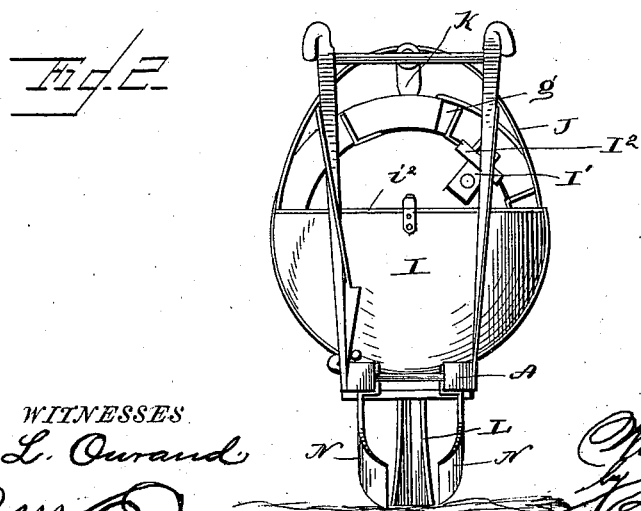
WITNESSES
F. L. Ourand
R. W. Elliott
INVENTOR
William L. Coffin
by J. Sauis Bagger & Co
Attorneys
N. PETERS. Photo-Lithographer, Washington, D. C.

(No Model.) 3 Sheets—Sheet 2.
W. L. COFFIN.
POTATO PLANTER AND SEED DRILL.
No. 408,585. Patented Aug. 6, 1889.
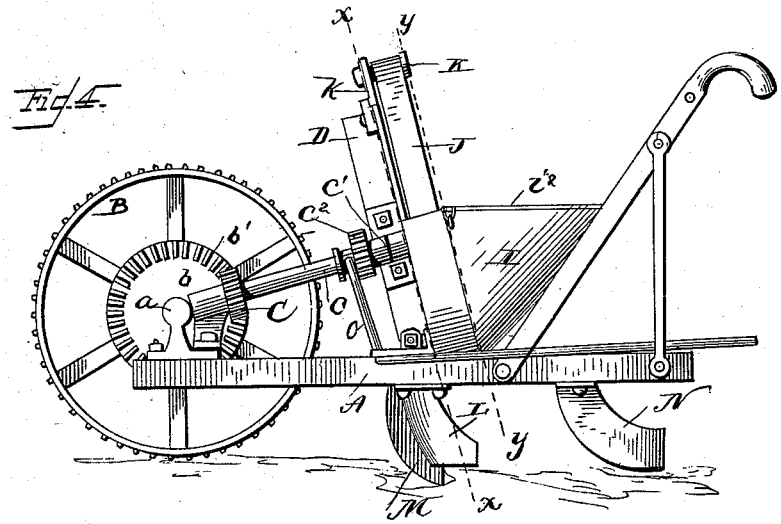
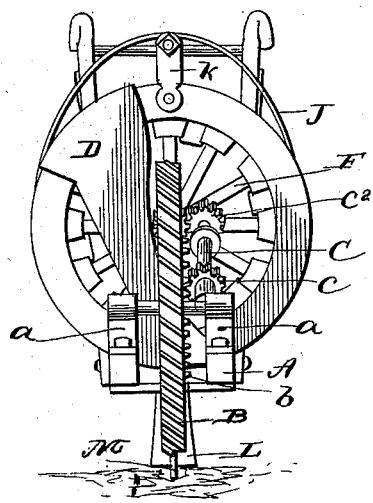
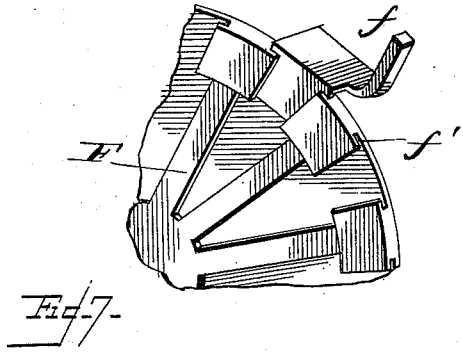
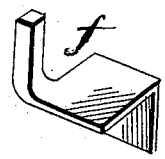
WITNESSES
F. L. Ourand
R. W. Elliott
INVENTOR
William L. Coffin,
by Louis Baggert
Attorney (No Model.) 3 Sheets—Sheet 3.
W. L. COFFIN.
POTATO PLANTER AND SEED DRILL.
No. 408,585. Patented Aug. 6, 1889.
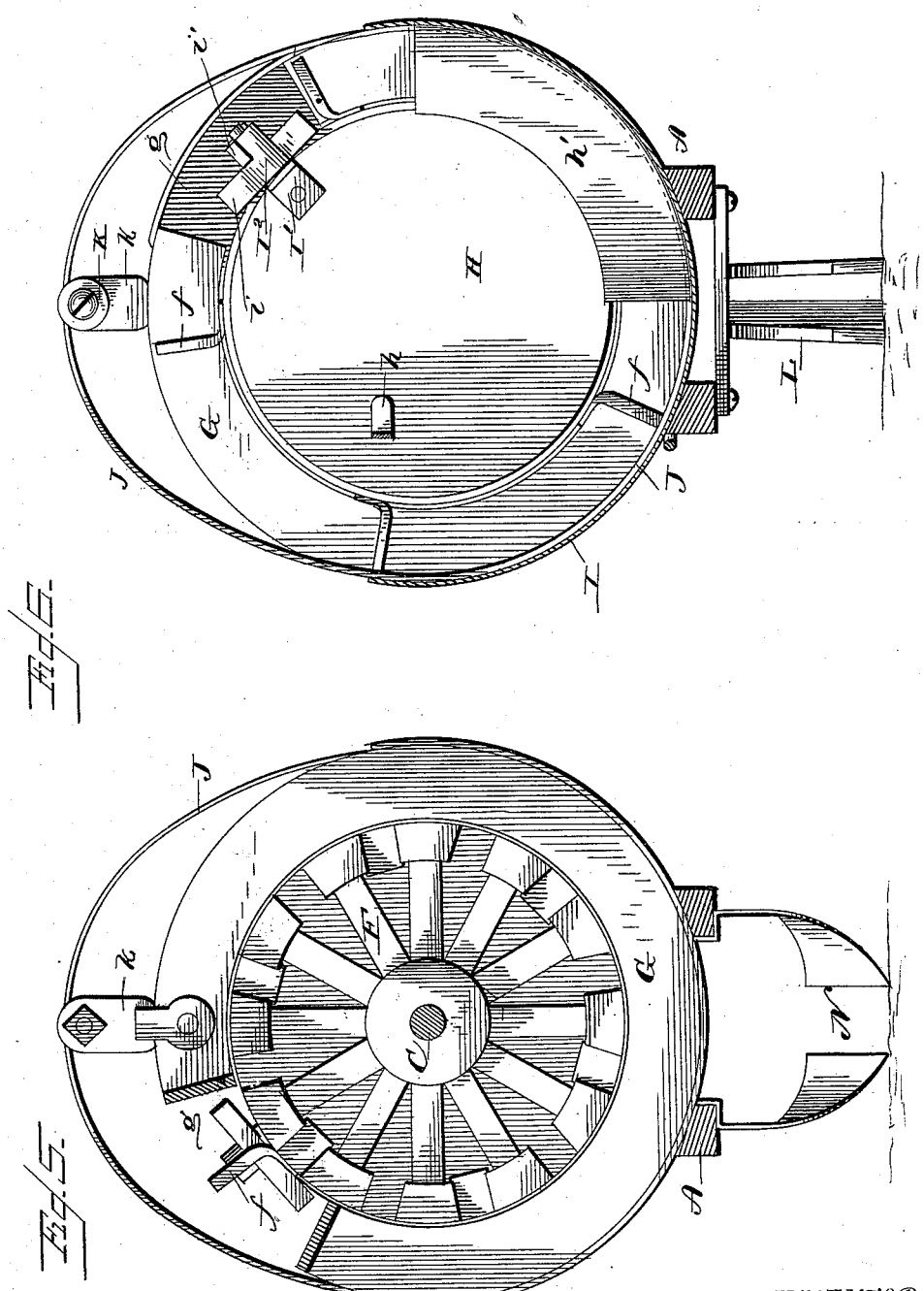

UNITED STATES PATENT OFFICE.

WILLIAM LORIN COFFIN, OF BLOOMINGPORT, INDIANA.

POTATO-PLANTER AND SEED-DRILL.

SPECIFICATION forming part of Letters Patent No. 408,585, dated August 6, 1889.

Application filed September 28, 1888. Serial No. 286,675. (No model.)

*To all whom it may concern:*

Be it known that I, WILLIAM LORIN COFFIN, a citizen of the United States, and a resident of Bloomingport, in the county of Randolph and State of Indiana, have invented certain new and useful Improvements in Combined Potato-Planters and Seed-Drills; and I do hereby declare that the following is a full, clear, and exact description of the invention, which will enable others skilled in the art to which it appertains to make and use the same.

This invention relates to a combined potato-planter and seed-drill.

The object is to produce a device which may be used either as a potato-planter or seed-drill—one that will open the furrow, drop the seed, and then turn in the soil upon the seed. The object is also to produce a cheap, durable, and simple device for the purposes above stated.

With these objects in view the invention consists in the novel construction and combination of parts of a combined potato-planter and seed-drill, as will be hereinafter fully described in the specification, illustrated in the drawings, and pointed out in the claims.

In the accompanying drawings, forming part of this specification, and in which like letters of reference indicate corresponding parts, I have illustrated one form of device embodying the essential features of my invention, although the same may be carried into effect in other ways without in the least departing from the spirit of the same, and in these drawings—

Figure 1 is a perspective view of the device. Fig. 2 is an end view of the same, looking forward from the handles of the device. Fig. 3 is an end view of the same, but taken from the opposite side to that shown in Fig. 2. Fig. 4 is a side elevation showing the driving-wheel and the intermediate mechanism for transmitting motion to the planting device. Fig. 5 is a vertical sectional view taken on the line $x\ x$ of Fig. 4. Fig. 6 is a vertical sectional view taken on the line $y\ y$ of Fig. 4; and Fig. 7 is a detail view of the wheel, showing the arms for carrying the potatoes to the discharge-spout and the arms or sweeps secured thereto.

Referring to the drawings, A designates the frame of the machine, to the rear end of which are secured the handles for guiding the same when operated. At the forward end of this frame and mounted in suitable boxes $a$ is the driving-wheel B for imparting motion to the feeding device, the center of this wheel being made solid, as shown at $b$, and provided with a number of teeth $b'$ for engaging the teeth on the wheel C on a counter-shaft $c$. One end of this counter-shaft works in an adjustable box $c'$, secured to the standard carrying the boxes $a$ of the driving-wheel and the other end in a box secured to the discharge-spout D, at which end is mounted another gear-wheel $c^2$. The box $c'$, in which the counter-shaft is mounted, is provided with another box $c^3$, in which is mounted a shaft E, to one end of which is secured a gear-wheel meshing with the gear-wheel $c^2$ and the other end with a wheel F, to which the sweeps $f$ are secured, which wheel I will designate, for the sake of convenience, throughout the specification the "feeding-wheel." This feeding-wheel is constructed with a number of dove-tailed grooves $f'$, in which the cups are set, and are held in place by means of an annular rim G, which forms a part of the sustaining-frame of the mechanism, and to which is secured the discharge-spout D.

H designates a shield, which is rigidly secured within the hopper I by means of a brace $h$, which extends back and is pivoted to the hopper of the machine. To the lower side of the shield is secured a guard $h'$, which fits over a portion of the cups to prevent too large a quantity of the potatoes or other substance with which the hopper may be filled from entering between the cups.

I' designates a shoulder secured to the upper part of the shield and carrying a hub I², provided with arms, which are so placed that when the feeding-wheel revolves the cup will strike the lower arms $i$, and cause the upper ones $i'$ to throw any material, which may remain on the sweeps into the discharge-spout.

J designates a flexible band, which passes around the cups and over an adjustable pulley K, the axle of which fits in a slot in a shoulder $k$ on the rim G, by means of which the said rim may be tightened or loosened, as desired, the particular function for which this rim is desired being fully described farther on.

L designates the furrow-opening plow, to the upper part of which is bolted a colter M, which fits in a groove $l$ in the said furrow-opening plow, and immediately behind the plow are secured to the frame two coverers N, which, when the device is in operation, serve to turn in the furrow upon the seed that have been dropped.

In operation the hopper I is filled with potatoes and the lid $i^2$ closed. When the drive-wheel B (the periphery of which is grooved or notched to prevent its slipping) passes over the ground, it revolves the shaft C, and with it the feeding-wheel F. This causes the cups to carry up the potatoes that fall against them to the discharge-spout D, the flexible band J being between the sweeps and the sides of the hopper, thus preventing any of the potatoes from becoming clogged. It is to be understood that this flexible band revolves with the cups by the pressure of the same against it. As the cups approach the discharge-spout, the band leaves them, by reason of the fact that in passing over the pulley K it is caused to assume an elliptical form, as shown in Fig. 3. The arms on the hub $I^2$ here come in contact with the potatoes on the cups and project them into the discharge-spout D, from which point they pass down and escape through the channel $l'$ in the furrow-opening plow, and are dropped into the ground. The coverers N, as before described, then turn the furrow in over the seed.

When the device is to be transported from the field, it is desirable to prevent the mechanism from working, and in order to do this a shifter O is pivoted to the frame of the machine, and is provided with a collar fitting on the hub of the gear-wheel C, so that it will be only necessary to throw the shifter up and cause the gear-wheel to be thrown out of contact with the gear-wheel $C^2$, which operates the feeding-wheel.

It will thus be seen that although this device is comparatively simple of construction it will be found highly efficient and durable in use, and may be manufactured at a comparatively small expense.

Having thus fully described my invention, what I claim as new, and desire to secure by Letters Patent, is—

1. The combination of the hopper, an annular rim secured thereto, a discharge-spout secured to the annular rim, a feed-wheel within the hopper, a shield, and a guard secured to the shield to regulate the flow of the material with which the hopper is filled to the feed-wheel, substantially as described.

2. The combination of the hopper, an annular rim secured thereto, a pulley journaled on the rim, a feed-wheel journaled in the hopper, and a flexible band moving in the hopper and over the pulley, substantially as and for the purpose specified.

In testimony that I claim the foregoing as my own I have hereunto affixed my signature in presence of two witnesses.

WILLIAM LORIN COFFIN.

Witnesses:
ELKANAH OZBEN,
JENNIE RASH.